(12) United States Patent
Erenrich et al.

(10) Patent No.: US 11,436,523 B2
(45) Date of Patent: Sep. 6, 2022

(54) SYSTEMS AND METHODS FOR SELECTING MACHINE LEARNING TRAINING DATA

(71) Applicant: Palantir Technologies Inc., Palo Alto, CA (US)

(72) Inventors: Daniel Erenrich, Mountain View, CA (US); Matthew Elkherj, Menlo Park, CA (US)

(73) Assignee: Palantir Technologies Inc., Palo Alto, CA (US)

(*) Notice: Subject to any disclaimer, the term of this patent is extended or adjusted under 35 U.S.C. 154(b) by 1100 days.

(21) Appl. No.: 16/027,161

(22) Filed: Jul. 3, 2018

(65) Prior Publication Data

US 2018/0330280 A1    Nov. 15, 2018

Related U.S. Application Data

(63) Continuation of application No. 15/644,231, filed on Jul. 7, 2017, now Pat. No. 10,325,224.

(60) Provisional application No. 62/475,689, filed on Mar. 23, 2017.

(51) Int. Cl.
G06N 5/04    (2006.01)
G06N 20/00   (2019.01)

(52) U.S. Cl.
CPC ............... G06N 20/00 (2019.01); G06N 5/04 (2013.01)

(58) Field of Classification Search
CPC ........................................................ G06N 5/04
USPC ............................................................. 706/12
See application file for complete search history.

(56) References Cited

U.S. PATENT DOCUMENTS

2010/0293117 A1* 11/2010 Xu ................. G06N 20/00
                                                706/12
2017/0052958 A1*  2/2017 Manning ........... G06F 16/35

OTHER PUBLICATIONS

Mozafari et al "Scaling Up Crowdsourcing to Very Large Datasets: A Case for Active Learning" 2014 (Year: 2014).*
Sarawagi et al ("Interactive Deduplication using Active Learning" 2002) (Year: 2002).*
Official Communication for U.S. Appl. No. 15/644,231 dated Nov. 22, 2017.
Official Communication for U.S. Appl. No. 15/644,231 dated Aug. 16, 2017.
Mozafari et al., "Scaling Up Crowdsourcing to Very Large Datasets: A Case for Active Learning," 2014.

* cited by examiner

*Primary Examiner* — Lut Wong
(74) *Attorney, Agent, or Firm* — Sheppard Mullin Richter & Hampton LLP

(57) ABSTRACT

Systems and methods are provided for selecting training examples to increase the efficiency of supervised active machine learning processes. Training examples for presentation to a user may be selected according to measure of the model's uncertainty in labeling the examples. A number of training examples may be selected to increase efficiency between the user and the processing system by selecting the number of training examples to minimize user downtime in the machine learning process.

20 Claims, 8 Drawing Sheets

| Number | Entity ID | | Entity Location | | | | Phone Number | Email |
|---|---|---|---|---|---|---|---|---|
| | Name 222 | Code 224 | State 232 | City 234 | Zip Code 236 | Street Address 238 | 240 | 250 |
| 1 | User 1 | EID 1 | California | Palo Alto | 12345 | 123 Mail St. | 1234567899 | PA@email.com |
| 2 | User 2 | EID 2 | California | San Francisco | 22222 | 987 Hill Drive | (987) 654-3210 | SF@email.com |
| 3 | Unknown | CE 002 | Cali | Palo Alto | 12345 | 777 Tech Street | (123) 456-7899 | Cali@email.com |
| 4 | User 1 | EID 4 | California | San Diego | 33333 | 111 Bio Circle | 7134432109 | User1@email.com |
| 5 | User 3 | Unknown | Unknown | Unknown | Unknown | Unknown | 9876543210 | User3@email.com |
| 100,000,000 | User N | EID 0 | TX | Dallas | 76262 | 613 Lovers Lane | (444) 111-3301 | Dallas@TX.com |

Fig. 2

| | Consuming Entity ID (e.g., name or code) | Consuming Entity Location | | | | Provisioning Entity ID (e.g., name or code) | Provisioning Entity Location | | | | Type of Provisioning Entity (e.g., name or code) | Interaction Amount (e.g., in Dollars) | Time of Interaction | |
|---|---|---|---|---|---|---|---|---|---|---|---|---|---|---|
| Number | | State | City | Zip Code | Street Address | | State | City | Zip Code | Street Address | | | Date | Time |
| 1 | User 1 | Ca | Palo Alto | 94304 | 123 Main St | PE001 | Ca | Palo Alto | 94304 | 234 University Ave | Gas Station | 74.99 | 2018/01/23 | 10:32 |
| 2 | CE002 | Ca | Sunnyvale | 94085 | 123 Murphy St | Merchant 2 | ? | ? | ? | ? | Supermarket | 83.56 | 2018/04/05 | 11:20 |
| 3 | User 1 | Ca | Palo Alto | 94304 | 123 Main St | Merchant 3 | ? | ? | ? | ? | TYPE113 | 32.11 | 2018/05/21 | 16:00 |
| 4 | User 3 | Ca | San Francisco | 94102 | 9999 Lombard St | Merchant 8 | Ca | San Francisco | 94102 | 123 Mission St | Coffee Shop | 6.67 | 2018/07/21 | 17:00 |
| 5 | User 3 | ? | ? | ? | ? | Merchant 8 | Ca | San Francisco | 94102 | 123 Mission St | Coffee Shop | 6.34 | 2018/08/11 | 8:00 |
| 50,000 | User N | Ca | Beverly Hills | 90210 | 123 Whatever Blvd | Merchant N | Ca | Beverly Hills | 90210 | 789 Whatever Blvd | TYPE799 | 69.23 | 2018/10/22 | 14:00 |

Fig. 3

SYSTEMS AND METHODS FOR SELECTING MACHINE LEARNING TRAINING DATA

CROSS REFERENCE TO RELATED APPLICATIONS

This application is a continuation application of U.S. patent application Ser. No. 15/644,231, filed Jul. 7, 2017, now U.S. Pat. No. 10,325,224 B1, which claims the benefit under 35 U.S.C. § 119(e) of the U.S. Provisional Application Ser. No. 62/475,689, filed Mar. 23, 2017, the content of which is hereby incorporated by reference in its entirety.

FIELD OF THE INVENTION

This disclosure relates to approaches for selecting machine learning training data.

BACKGROUND

Under some approaches, machine learning models may be trained by human users labeling data sets. Labeled data sets may be used by machine learning algorithms to update machine learning models in an iterative process. Model training may be accelerated by selecting data sets or examples for human scoring about which the model has the least information. Human scoring of data examples about which the model is uncertain provides more information to the model than scoring of data examples that the model already knows how to classify. Selecting uncertain examples, however, may be time consuming and resource intensive, as each labeled data example may produce model changes which produce uncertainty changes. Updating example uncertainty for each example within a large dataset may be prohibitively time-consuming and resource-intensive. These and other drawbacks exist with conventional machine learning training.

SUMMARY

The systems, methods, and devices described herein each have several aspects, no single one of which is solely responsible for its desirable attributes. Without limiting the scope of this disclosure, several non-limiting features will now be discussed briefly.

A claimed solution rooted in computer technology overcomes problems specifically arising in the realm of computer technology. In various implementations, a computing system is configured to provide methods that accelerate machine learning processes. A machine learning model may be trained with human labeled data examples and may be updated as the examples are labeled. A subset or batch of data examples may be selected from a complete data set according to their uncertainty levels. As the batch of data examples are labeled, a machine learning model may be updated and applied to the remaining batch data examples to update their uncertainty levels. The system may select the most uncertain data example from the batch for labeling. While the user continues to label examples of the batch dataset, the system may rescore the complete dataset to select the next batch of examples to be provided to the user as the first batch is completed, thus providing a lag-free and efficient machine learning model training system.

In an implementation, a system for training a machine learning model is provided. The system may include one or more processors and a memory storing instructions. When executed by the one or more processors, the instructions may cause the system to obtain a machine learning model and a training dataset, the training dataset including a plurality of training examples; determine uncertainty scores for the plurality of training examples according to the machine learning model; select a first example batch from the plurality of training examples according to uncertainty scores of the plurality of training examples; update the machine learning model according to at least one labeled training example of the example batch; determine updated uncertainty scores for the plurality of training examples according to the updated machine learning model; and select a second example batch from the plurality of training examples according to the updated uncertainty scores of the plurality of training examples.

In an implementation, a method for training a machine learning model is provided. The method may be performed on a computer system having one or more physical processors programmed with computer program instructions that, when executed by the one or more physical processors, cause the computer system to perform the method. The method may include obtaining, by the computer system, a machine learning model and a training dataset, the training dataset including a plurality of training examples; determining, by the computer system, uncertainty scores for the plurality of training examples according to the machine learning model; selecting, by the computer system, a first example batch from the plurality of training examples according to uncertainty scores of the plurality of training examples; updating, by the computer system, the machine learning model according to at least one labeled training example of the example batch; determining, by the computer system, updated uncertainty scores for the plurality of training examples according to the updated machine learning model; and selecting, by the computer system, a second example batch from the plurality of training examples according to the updated uncertainty scores of the plurality of training examples.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

Reference will now be made to the accompanying drawings, which illustrate example embodiments of the present disclosure and in which:

FIG. 2 is a block diagram of an example first list, consistent with embodiments of the present disclosure;

FIG. 3 is a block diagram of an example second list, consistent with embodiments of the present disclosure;

DETAILED DESCRIPTION

Reference will now be made in detail to example embodiments, the examples of which are illustrated in the accompanying drawings. Whenever possible, the same reference numbers will be used throughout the drawings to refer to the same or like parts.

Embodiments describe methods, systems, and non-transitory computer-readable mediums for improving machine learning systems. Some implementations described herein relate to the training of machine learning systems. Supervised active learning in machine learning systems may be a powerful and efficient method of developing and improving machine learning models. Methods and systems embodied herein may be used to accelerate the development and improvement of machine learning models through the selection of training examples. Training examples for which the model performs poorly may be selected for improving the model, and may serve to improve the model more quickly than the selection of training examples for which the model performs well. Methods may be used to adjust the timing of model updates and training set reevaluations to optimize resource use in model training. Machine learning techniques and systems described herein may, in some implementations, be used in an entity resolution system configured analyze data structures including large numbers of records. In some implementations of an entity resolution system, the system may be configured with methods and systems to match and/or resolve similar or common entities. Machine learning techniques described herein may be used, for example, in such an entity resolution system, but are not limited to such.

Figure 1:
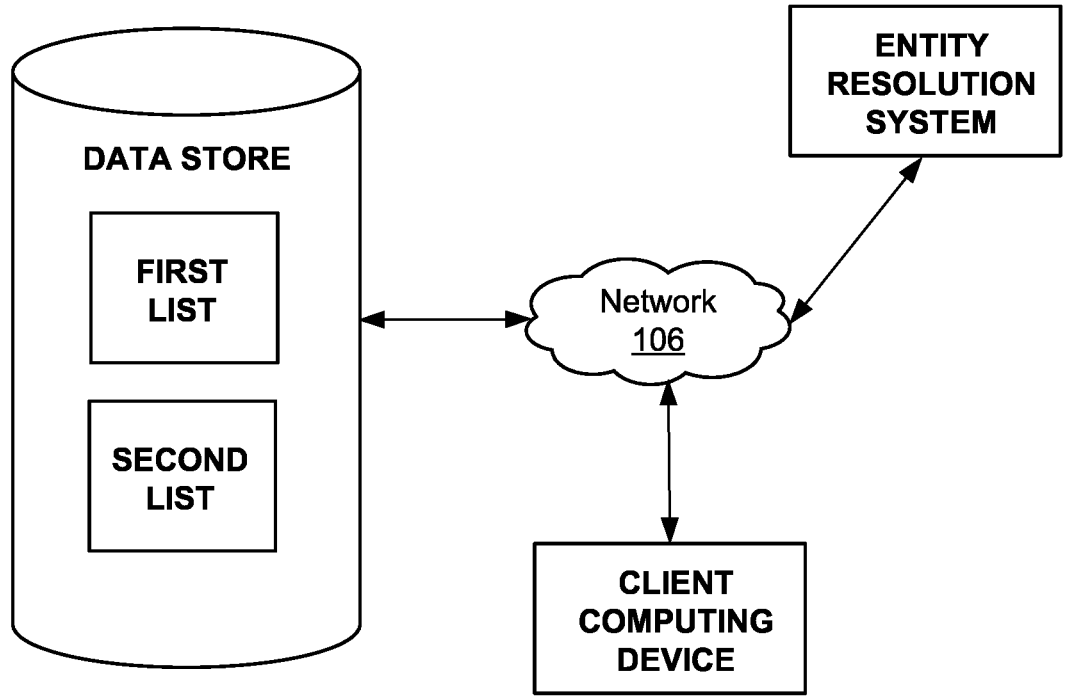
FIG. 1 is a block diagram of an example system for associating related records to common entities across multiple lists, consistent with embodiments of the present disclosure.

FIG. 1 is a block diagram of an example system 100 for associating related records to common entities across multiple lists, consistent with embodiments of the present disclosure. As shown, example system 100 includes a client computing device 110, an entity resolution system 120, and a data storage device 130, which may include a first list 140 and in some embodiments a second list 150. Further, client computing device 110, entity resolution system 120, and data storage device 130 can communicate over a network 160.

First list 140 and second list 150 can include data records, each having a number of fields. Examples of first list 140 and second list 150 are shown in FIGS. 2 and 3, respectively. Data storage device 130, however, does not need to include only first list 140 and second list 150. Data storage device 130 can include any numbers of lists, including only one list that would represent both first list 140 and second list 150. Also, example system 100 can include more than one data storage device 130. In the case of more than one data storage device 130, first list 140 and second list 150 can be in different data storage devices or can be in the same data storage device.

First list 140 and second list 150 can be any type of list, including a data structure, or part of a data structure, a database, or part of a database. Some examples of data structures are arrays, tuples, hash tables, sets, graphs, queues, stacks, etc. An example of a database is a Relational Database Management System (RDBMS) that stores the transaction data as rows in relational tables. Alternatively, first list 140 and second list 150 can be a column-oriented database management system that stores data as sections of columns of data rather than rows of data. This column-oriented DBMS can have advantages, for example, for data warehouses, customer relationship management systems, and library card catalogues, and other ad hoc inquiry systems where aggregates are computed over large numbers of similar data items. A column-oriented DBMS can be more efficient than an RDBMS when an aggregate needs to be computed over many rows but only for a notably smaller subset of all columns of data, because reading that smaller subset of data can be faster than reading all data. A column-oriented DBMS can be designed to efficiently return data for an entire column, in as few operations as possible. A column-oriented DBMS can store data by serializing each column of data of first list 140 and second list 150. First list 140 and second list 150 do not need to be the same type of list.

Client computing device 110 can include one or more software applications configured to present data and translate user inputs into requests for record association by entity resolution system 120. Client computing device 110 can also run on entity resolution system 120. In any event, a user would interact with example system 100 through client computing device 110. And while client computing device 110 is shown in FIG. 1, it is appreciated that multiple client computing devices can interact with data storage device 130 and entity resolution system 120.

Figure 4:
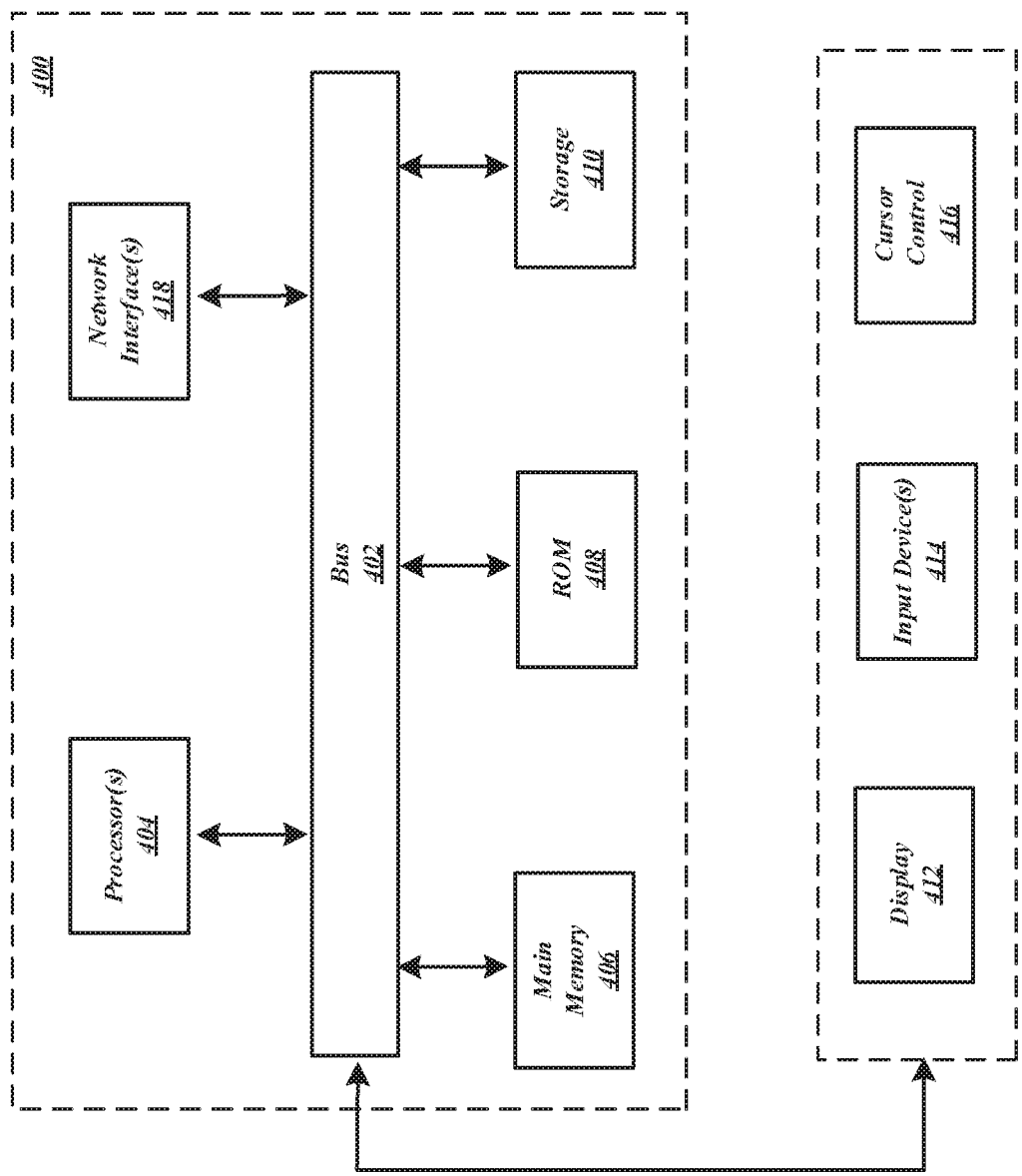
FIG. 4 is a block diagram of an example computer system, consistent with embodiments of the present disclosure.

Entity resolution system 120 can be a computing system configured to associate related records to common entities across multiple lists. For example, entity resolution system 120 can be a computer system configured to execute software or a set of programmable instructions that collect or receive records from different lists and process those records to associate related records to common entities that may not have useful identical fields while still excluding unrelated entity records, resulting in the identification of entity records that relate to a common entity. In some embodiments, entity resolution system 120 can be implemented using a computer system 400, as shown in FIG. 4 and described below.

Entity resolution system 120 can include one or more computing devices (e.g., server(s)), memory storing data and/or software instructions (e.g., database(s), memory device(s), etc.), and other known computing components. According to some embodiments, entity resolution system 120 can include one or more networked computers that execute processing in parallel or use a distributed computing architecture. Entity resolution system 120 can be configured to communicate with one or more components of system 100, and it can be configured to provide entity resolution information via an interface(s) accessible by users over a network (e.g., the Internet). For example, entity resolution system 120 can include a web server that hosts a web page accessible through network 160. In some embodiments, entity resolution system 120 can include an application server configured to provide data to one or more client applications executing on computing systems connected to entity resolution system 120 via network 160.

Entity resolution system 120 can read data from multiple lists (e.g., first list 140 and second list 150) from one or more data storage devices (e.g., data storage device 130). Entity resolution system 120 can store resolution data on at least one of client computing device 110, entity resolution system 120, data storage device 130, first list 140, and second list 150.

Entity resolution system 120 can use the resolution data to associate records retrieved from first list 140 and second list 150. Entity resolution system 120 can also pair the records from first list 140 and second list 150. Entity resolution system 120 can use the pairs to provide insights about a particular entity. Entity resolution system 120 can, in some embodiments, use the pairs to identify clusters of records that reference a common particular entity. In other embodiments, entity resolution system 120 can use the pairs to identify a canonical entity for records that refer to the same entity in different ways. For example, records may refer to a particular geographic location entity as "New York City," "NYC," "Manhattan," and "Soho." By identifying pairs of records that reference the entity, entity resolution system 120 can determine a canonical name for the location and associate all of the records in the cluster with the canonical name.

FIG. 2 is a block diagram of an example first list 140, consistent with embodiments of the present disclosure. First list 140 can store records associated with entities. As shown in FIG. 2, first list 140 can include a very large number of records.

For example, first list 140 includes 100 billion records. While each record of first list 140 is depicted as a separate row in FIG. 2, it will be understood that each such record can be represented in other ways, for example, by a column or any other technique in the art. Also, first list 140 can include duplicate entities or duplicate sub-entities, as shown in rows 201 and 204. Each record can include several categories of information. For example, first list 140 includes: number category 210; entity identification category 220; entity location category 230; phone number category 240; and email category 250. It will be understood that FIG. 2 is merely example and that first list 140 can include more or less categories of information associated with a record.

Number category 210 can uniquely identify each record of first list 140. For example, first list 140 depicts 100 billion records as illustrated by number category 210 of the last row of first list 140 as 100,000,000,000. It will be understood that this disclosure is not limited to any number of records and further that this disclosure can extend to a list with more or less than 100 billion records. It is also appreciated that number category 210 need not exist in first list 140.

Entity identification category 220 can identify an entity. In some embodiments, entity identification category 220 can represent the entity identification by providing at least one of: a name of the entity (e.g., name sub-category 222; User 1 for record 201; unknown for record 203); a code uniquely identifying the entity (e.g., code sub-category 224; EID1 for record 201; unknown for record 205). For example, the identifiers under entity identification category 220 can be a credit card number that can identify a person or a family, a social security number that can identify a person, a phone number or a MAC address associated with a cell phone of a user or family, or any other identifier.

Entity location category 230 can represent location information of the entity. In some embodiments, entity location category 230 can represent the location information by providing at least one of: a state of residence of the entity (e.g., state sub-category 232; California for record 201; unknown for record 205); a city of residence of the entity (e.g., city sub-category 234; Palo Alto for record 201; unknown for record 205); a zip code of residence of the entity (e.g., zip code sub-category 236; 12345 for record 201; unknown for record 205); and a street address of residence of the entity (e.g., street address sub-category 238; 123 Main Street for record 201; unknown for record 205).

Phone number category 240 can identify an entity's phone number. The phone number can be a character sequence. The character sequence can comprise of numbers, letters, spaces, or symbols, which can include "(," ")," ".," and "-." For example, phone number category 240 of record 201 is 1234567899, while phone number category 240 of record 302 is (987) 654-3210. Also, the phone number can be unknown. The phone number provides a way for the entity to be contacted over a phone. It would be recognized by a person of ordinary skill in the art that a phone number is not only for connecting over a phone.

Email category 250 can identify an entity's email address. The email address should include a sequence of numbers and letters followed by an "@" symbol. After the "@" symbol will be another sequence of numbers and letters followed by a period and another sequence of numbers and letters. For example, email category 250 of record 201 is sf@email.com. The email address can be unknown. The email address provides a way for the entity to be contacted over the internet. It would be recognized by a person of ordinary skill in the art that an email address is not only for connecting over the internet.

FIG. 3 is a block diagram of an example second list 150, consistent with embodiments of the present disclosure. Second list 150 can store data records associated with records involving multiple entities. As shown in FIG. 3, second list 150 can include data associated with a very large number of records associated with multiple entities. For example, second list 150 can include 50 billion records. While each record of second list 150 is depicted as a separate row in FIG. 3, it will be understood that each such record can be represented in other ways, for example, by a column or any other technique in the art. Each record can include several categories of information. For example, the several categories can include, number category 310; consuming entity identification category 320; consuming entity location category 330; provisioning entity identification category 340; provisioning entity location category 350; type of provisioning entity category 360; record amount category 370; and time of record category 380. It will be understood that FIG. 3 is merely example and that second list 150 can include more or less categories of information associated with a record.

Number category 310 can uniquely identify each record of second list 150. For example, second list 150 depicts 50 billion record as illustrated by number category 310 of the last row of second list 150 as 50,000,000,000. In FIG. 3, each row depicting a record can be identified by an element number. For example, record number 1 can be identified by element 301; record number 2 can be identified by element 302; and so on such that record 50,000,000,000 can be identified by 399B. It will be understood that this disclosure is not limited to any number of records and further that this disclosure can extend to lists with more or less than 50 billion records. It is also appreciated that number category 310 need not exist in second list 150.

Consuming entity identification category 320 can identify a consuming entity. In some embodiments, consuming entity identification category 320 can represent a name (e.g., User 1 for record 301; User N for record 399B) of the consuming entity. Alternatively, consuming entity identification category 320 can represent a code uniquely identifying the consuming entity (e.g., CE002 for record 302). For example, the identifiers under the consuming entity identification category 320 can be a credit card number that can identify a person or a family, a social security number that can identify a person, a phone number or a MAC address associated with a cell phone of a user or family, or any other identifier.

Consuming entity location category 330 can represent location information of the consuming entity. In some embodiments, consuming entity location category 330 can represent the location information by providing at least one of: a state of residence (e.g., state sub-category 332; California for element 301; unknown for record 305) of the consuming entity; a city of residence (e.g., city sub-category 334; Palo Alto for record 301; unknown for record 305) of the consuming entity; a zip code of residence (e.g., zip code sub-category 336; 94304 for record 301; unknown for record 305) of the consuming entity; and a street address of residence (e.g., street address sub-category 438; 123 Main St. for record 301; unknown for record 305) of the consuming entity.

Provisioning entity identification category 340 can identify a provisioning entity (e.g., a merchant or a coffee shop). In some embodiments, provisioning entity identification category 340 can represent a name of the provisioning entity (e.g., Merchant 2 for record 302). Alternatively, provisioning entity identification category 340 can represent a code uniquely identifying the provisioning entity (e.g., PE001 for record 301). Provisioning entity location category 350 can represent location information of the provisioning entity. In some embodiments, provisioning entity location category 350 can represent the location information by providing at least one of: a state where the provisioning entity is located (e.g., state sub-category 352; California for record 301; unknown for record 302); a city where the provisioning entity is located (e.g., city sub-category 354; Palo Alto for record 301; unknown for record 302); a zip code where the provisioning entity is located (e.g., zip code sub-category 356; 94304 for record 301; unknown for record 302); and a street address where the provisioning entity is located (e.g., street address sub-category 358; 234 University Ave. for record 301; unknown for record 302).

Type of provisioning entity category 360 can identify a type of the provisioning entity involved in each record. In some embodiments, type of provisioning entity category 360 of the provisioning entity can be identified by a category name customarily used in the industry (e.g., Gas Station for record 301) or by an identification code that can identify a type of the provisioning entity (e.g., TPE123 for record 303). Alternatively, type of the provisioning entity category 360 can include a merchant category code ("MCC") used by credit card companies to identify any business that accepts one of their credit cards as a form of payment. For example, MCC can be a four-digit number assigned to a business by credit card companies (e.g., American Express™, MasterCard™, VISA™) when the business first starts accepting one of their credit cards as a form of payment.

In some embodiments, type of provisioning entity category 360 can further include a sub-category (not shown in FIG. 3), for example, type of provisioning entity sub-category 361 that can further identify a particular sub-category of provisioning entity. For example, a record can comprise a type of provisioning entity category 360 as a hotel and type of provisioning entity sub-category 361 as either a bed and breakfast hotel or a transit hotel. It will be understood that the above-described examples for type of provisioning entity category 360 and type of provisioning entity sub-category 361 are non-limiting and that second list 150 can include other kinds of such categories and sub-categories associated with an record.

Record amount category 370 can represent a transaction amount (e.g., $74.56 for record 301) involved in each record. Time of record category 380 can represent a time at which the record was executed. In some embodiments, time of record category 380 can be represented by a date (e.g., date sub-category 382; Nov. 23, 2013, for record 301) and time of the day (e.g., time sub-category 384; 10:32 AM local time for record 301). Time sub-category 384 can be represented in either military time or some other format. Alternatively, time sub-category 384 can be represented with a local time zone of either provisioning entity location category 350 or consuming entity location category 330.

In some embodiments, first list 140 may be a canonical list of entities, such as a list of city names and related information (e.g., geographic boundaries, postal codes, etc.), and entity resolution service 120 may associate each record of the second list 150 with a canonical city name from the first list 140, as described in more detail below. In other embodiments, entity resolution service 120 may be utilized to resolve entities for a single list. For example, the entity resolution service 120 may analyze a first list 140 to identify clusters of transaction records that were generated by a common merchant entity. One skilled in the art will appreciate that the aforementioned examples are illustrative and not limiting.

Example Computing Systems

FIG. 4 depicts a block diagram of an example computer system 400 in which any of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a cathode ray tube (CRT) or LCD display (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may retrieves and executes the instructions. The instructions received by main memory 406 may optionally be stored on storage device 410 either before or after execution by processor 404.

The computer system 400 also includes a communication interface 418 coupled to bus 402. Communication interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Example Methods of Entity Resolution

Figure 5:
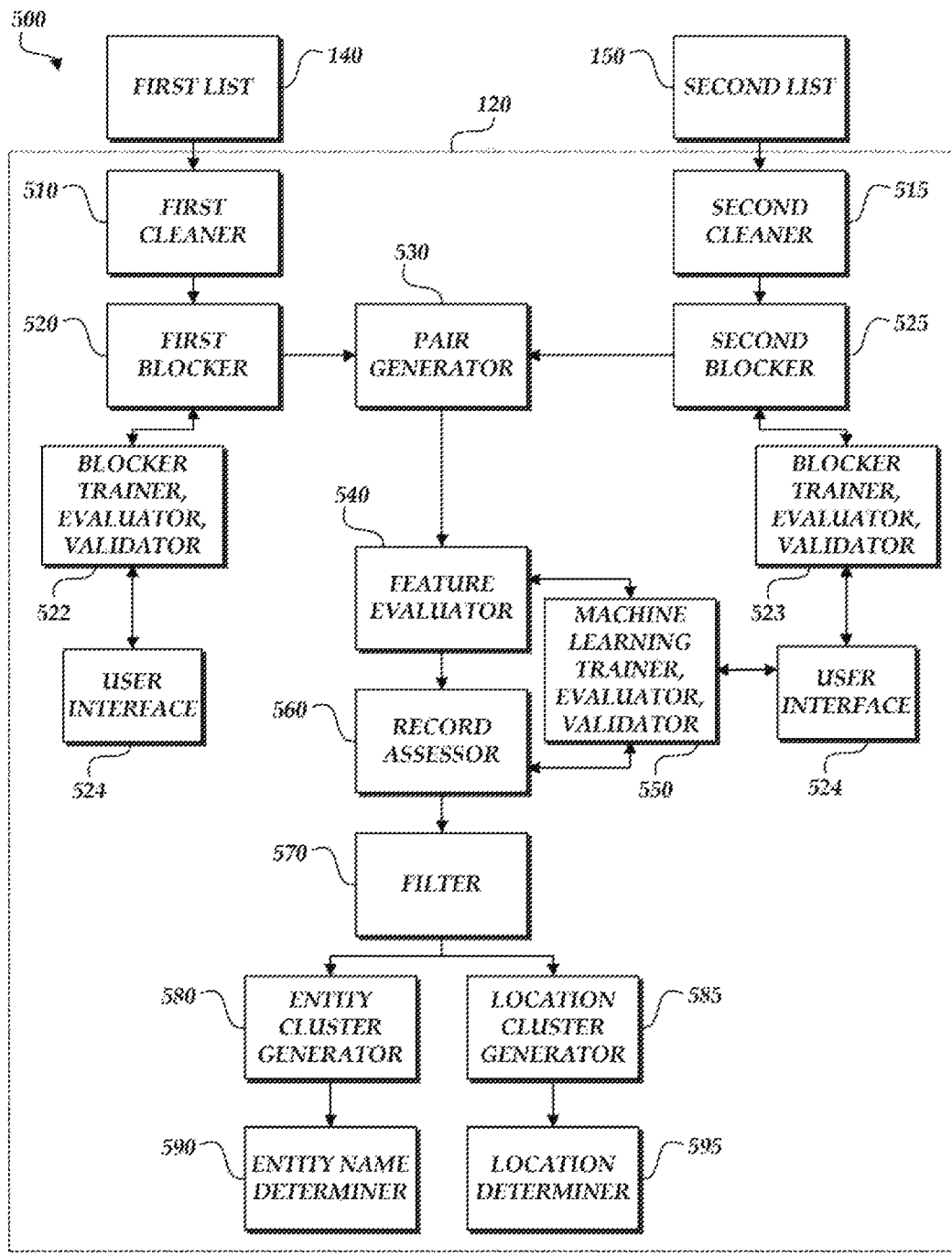
FIG. 5 is a block diagram representing an example process for generating clusters of records associated to common entities across multiple lists, consistent with embodiments of the present disclosure.

FIG. 5 shows a block diagram 500 representing an example process for associating related records to common entities across multiple lists, consistent with embodiments of the present disclosure. The dotted region, labeled 120, represents an example entity resolution system (e.g., entity resolution system 120 in FIG. 1). The example process can acquire two lists on the order of millions of records (e.g., first list 140 and second list 150) and determine whether records in each list are related.

The process can be used for at least one of data enrichment, data integration, or data deduplication. Data enrichment refers to processes used to enhance, refine, or otherwise improve raw data. Data integration involves combining data residing in different sources and providing users with a unified view of these data. Data deduplication refers to determining whether a particular list has duplicate entries. While FIG. 5 provides an example process flow for some embodiments of the present disclosure, it should be recognized by a person of skill in the art that not all steps need to be taken and that there can be additional steps.

As shown in FIG. 5, entity resolution system 120 can receive first list 140 and second list 150, which were described above in reference to FIGS. 1-3. Entity resolution system 120 can then process first list 140 using a first cleaner 510 and a first blocker 520.

First cleaner 510 can apply one or more cleaning functions to first list 140. Example cleaning functions can include making alphanumeric characters in each field lowercase, taking out punctuation from a field, taking out all numbers in a field, taking out everything but the numbers in the field, or switching "St" for "Street" or vice versa. Cleaning functions can be applied to the data in one or more fields in each record of first list 140. The cleaning functions can be used to normalize all of the records so that other functions can be more easily applied to first list 140. One or more cleaning functions can be chosen or determined automatically, by a user, or a combination thereof.

As shown above, after a cleaning function is applied, the data in the record of first list 140 can be altered by the cleaning function. In some embodiments, the data in the record of first list 140 will not be altered directly; but instead, either indicate that such cleaning function should be applied to the particular one or more fields in the future or associate the cleaned field with the original field in the first list 140. In some embodiments, the data in the record of first list 140 will not be altered at all; but instead, a new list will be created that includes the records with the cleaned fields.

After first list 140 has been cleaned in first cleaner 510, the cleaned records of first list 140 are provided to first blocker 520. First blocker 520 can reduce the number of comparisons necessary to determine if two records are related to a similar entity by reducing the number of relevant records. First blocker 520 assigns one or more records of first list 140 to one or more groups (also referred to herein as subgroups) based on one or more fields. For example, an assignment can be based on phone number. In this example, if the phone number of a record in first list 140 matches the phone number of another record in first list 140, the two records would be assigned to the same group. Further, a record may not have a match; and thus would be assigned to a group comprising of itself.

Entity resolution system 120 may also process second list 150 using a second cleaner 515 and a second blocker 525, which can provide similar functionality as those described above for first cleaner 510 and first blocker 520. While second cleaner 515 and second blocker 525 can provide similar functionality (e.g., cleaning and blocking), the application of that functionality may be different and may depend on how the data is stored in the fields of second list 150. For example, the field comprising (987) 654-3210 in first list 140 may be represented as 19876543210 in second list 150. For purposes of matching the data in the fields, it may be appropriate to clean or format the data so that the formatting of the data is consistent across both lists. If the desired end result is to compare a string of ten numbers, the field comprising (987) 654-3210 would need to have a cleaning function that removes everything but the numbers and the field comprising 19876543210 would need a cleaning function that removes the 1 from the front of the number.

Moreover, while FIG. 5 depicts two cleaners and two blockers, it may be appreciated that only one cleaner and blocker may be used, wherein the cleaner and blocker each provide different instances based on whether the received input is the acquired first list 140 or the acquired second list 150. It is also appreciated that entity resolution system 120 does not include one or more cleaners as the formatting of data between first list 140 and second list 150 are consistent. Moreover, it is appreciated that cleaning can take place after blocking or pair generation.

As described herein, the system may include user interfaces (e.g., user interface 524, which may be displayed to a user via client computing device 110) by which records may be reviewed and/or groups, models, etc. may be reviewed, trained, evaluated, and/or validated. In some implementations, the system may present groups generated by a blocking model in a user interface for review by a user so that the user may correct groups (e.g., remove or add records), or improve a blocking model in some way (e.g., change the fields that are matched, etc.). For example, a user may be able to use such a user interface to evaluate the size of a group, the distribution of groups, the frequency of groups generated based on given blocking models, the entropy of groups, and/or the like. The user may then, for example, select to discontinue use of a blocking model, modify/train a blocking model, and/or the like.

After one or more records from first list 140 and second list 150 have respectively been assigned to one or more groups, entity resolution system 120 uses a pair generator 530 to process at least one group from first list 140 and at least one group from second list 150. Pair generator 530 can associate a record of the one or more groups from first list 140 with a record of a group in the one or more groups from second list 150, as further explained in FIG. 7. The respective groups of each record can be chosen because the one or more fields that the groups were grouped by were similar. In some embodiments, pair generator 530 may process only a first list 140, and may generate pairs comprising two records from the first list 140. In further embodiments, pair generator 530 may process a first list 140 and second list 150, and may produce pairs that include a single record from each of the lists.

To pair these groups, pair generator 530 can perform a Cartesian product of the two groups. For example, a first group can comprise a first record and a second record while a second group can comprise a third record and a fourth record. The Cartesian product of the first group and the second group would be the entire first record with the entire third record, the entire first record with the entire fourth record, the entire second record with the entire third record, and the entire second record with the entire fourth record. The Cartesian product can also only pair relevant fields of each of the records rather than the entire records. Relevant fields can be determined through the blocking functions or some other determination.

Pairing can be accomplished with a separate data structure that comprises the two records that are paired together. Pairing can also be accomplished by associating the two records that are paired together without moving them to a new data structure.

In some embodiments, the pair generator may be trained, evaluated, validated, and improved via any of the methods described above and below in reference to the blocking models and pair evaluation models. For example, machine learning (including active learning/biased sampling) techniques may be used to improve the pair generator. Similarly, as described above in reference to the blocking models, weightings may be applied when combinations of criteria are used in generating pairs. The weightings may be optimized/trained to improve the accuracy of the pairings generated by the system.

In some embodiments, entity resolution system 120 can be split across one or more networked computers, communicatively coupled via a network (e.g., network 160). In some embodiments, the networked computers can be organized into a distributed computing architecture. For example, the distributed computing architecture can be a system such as Apache Hadoop or Spark. In these embodiments, for example, blocking functions (e.g., the blocking functions provided by first blocker 520 or second blocker 525) can run in parallel across the distributed clusters and can generate output keys for each record for use by pair generator 530. In some embodiments pair generator 530 and the remaining portions of entity resolution system 120 can continue on a single networked computer.

The paired lists are then processed in a feature evaluator 540. Feature evaluator 540 can evaluate a pair based on one or more of the fields in the records of the pair. The evaluation can be in the form of a numeric score or other evaluation type. The evaluation can be based on a computer generated or user specified function. For example, a pair can be evaluated by the difference in length of its first field. If the first field of the first record in the pair is "Trader Joes" and the first field of the second record in the pair is "Trader Jose," the evaluation by the difference in length of its first field would be 0.

Feature evaluator 540 can also evaluate a pair based on external features. External features include information other than information that is inherently included in either individual record in the pair. External features may include information that may be determined based on a comparison of the two records in the pair, or other analysis of the records in the pair. For example, an external feature may include a distance between the addresses identified in each record of the pair. In this example, two records may have a field that represents an address. An evaluation can send the addresses to a separate process that calculates the distance between the two addresses. An external feature can be added to a number of places, including the records of first list 140, the records of second list 150, a pair, or any combination thereof. The addition of external features can also occur at a number of places, including: before a list is in entity resolution system 120, when a list is in either first cleaner 510 or second cleaner 515, when a list is in first blocker 520 or second block 525, when a group is in pair generator 530, when a record is in feature evaluator 540, or any combination thereof.

Feature evaluator 540 can evaluate a pair one or more times. The one or more evaluation functions may or may not indicate similarity between the records. For example, an evaluation can be the number of words in a particular field. While such an evaluation may not indicate similarity between the records, this type of valuation may still be used in combination with other evaluations to determine similarity between the records.

After one or more evaluation functions are performed by feature evaluator 540, the one or more evaluations are associated with the pair that they are based on. The associations can be through a data structure that holds both records in the pair and the one or more evaluations. The associations can also be metadata or an indicator in the pair that points to the evaluations.

The pairs with the one or more evaluations can then be passed to a machine learning trainer/evaluator/validator 550, a record assessor 560, or some combination thereof. The trainer/evaluator/validator 550 can create, improve, and validate one or more pair evaluation models that can be applied in record assessor 560 to the pairs with the one or more evaluations. The pair evaluation models can ultimately determine if a particular record is related to another record. A pair evaluation model can also just be passed to record assessor 560, effectively bypassing trainer/evaluator/validator 550. The pair evaluation models can be generated, trained, evaluated, validated, and improved in the trainer/evaluator/validator 550 based on one or more machine learning techniques and based on a portion or all of the pairs with the one or more evaluations. The pair evaluation models can also be based on data not in the pairs, on past data of similar pairs, or on user inputs. The pair evaluation models may also be referred to herein as machine learning models. In some embodiments a pair evaluation model may be a statistical model.

The pair evaluation models may be generated based on machine learning techniques that can be supervised, semi-supervised, or unsupervised machine learning techniques, or some combination thereof. Techniques similar to those described above in reference to the blocking model training, evaluation, and validation may be used here also. For example, the pair evaluation models may be initially trained based on a permissive model, may be improved through automatic and/or manual (e.g., from a user via a user interface, e.g., user interface 524, which may be displayed to a user via client computing device 110) feedback, may be evaluated and validated using various criteria and via user interfaces, and the like.

A supervised machine learning technique can require a user (e.g., via a user interface, e.g., user interface 524) or some other information source to label each pair that the machine learning technique can rely on. Labeling can come in many forms, including a binary indicator of matching or not matching, likelihood that the two records in the pair represent a similar entity, or some other indicator that would aid in determining whether two records are related to a similar entity. Examples of a supervised machine learning technique include decisions trees, bagging, boosting, and random forest. As mentioned above in reference to blocking model validation, review and labeling may be accomplished on a pair-by-pair (or record) basis, or at a higher level. For example, distributions or other evaluation metrics may be reviewed by a user. Advantageously, evaluation by a user usefully may improve the pair evaluation model while simultaneously generating more positive record matches.

A semi-supervised machine learning technique can reduce the number of pairs that a user or some other information source needs to label. An example of a semi-supervised machine learning technique is active learning. Active learning can involve inspecting the pairs and/or their corresponding evaluations to determine which one or more pairs the entity resolution system 120 should inquire about. This inquiry can be provided to a user (e.g., via a user interface such as user interface 524) or some other information source so that one or more of these information sources can provide an input or label to the pair. The input or label can represent whether the user or some other information source deduces that the records of the pair are related to a similar entity. After the entity resolution system 120 receives labels for the one or more pairs, the machine learning technique can show the user or other information source one or more other available pairs for labeling.

After the machine learning technique has received, for example, a matching and non-matching label, the machine learning technique can either show more pairs to the user or other information source or automatically label the remaining pairs. Examples of techniques to automatically label the remaining pairs include linear and logistic regression. A pair is informative to the machine learning technique if it assists the machine learning technique in improving the pair evaluation model's ability to determine whether two records are related to the same entity and can be based on the one or more evaluations that have been made on the pairs by feature evaluator 540.

Efficient training, evaluation, and validation of the pair evaluation models are difficult due the sparse nature of the data. For example, in certain list data sets, positive matches may be sparse, or false positives or false negatives may be sparse also. Thus, random sampling may rarely identify matches that may usefully be evaluated to improve the pair evaluation models.

Accordingly, in some implementations, rather than randomly sampling record match results to validate the pair evaluation models, the active learning approach utilizes biased sampling of results. These biased samples are then automatically or manually (e.g., by a user via user interface 524) evaluated to identify false positives and/or false negatives. This evaluation/validation information is then fed back into the pair evaluation models to improve the models as described above. Biased samples advantageously generate much richer data for evaluation/validation than would otherwise be possible, and enables rapid improvement of the pair evaluation model.

Biased samples may be identified in a number of ways. For example, biased samples may be identified using a heuristic that selects record pairs that differ from one another on a particular key/field different from the keys/fields on which the records were matched. For example, the record pairs may have been matched based on a same physical address, but may differ from one another based on the first name field. Such a pair has a higher likelihood of being a false positive, and thus may be selected, e.g., for manual review.

In some embodiments, using the active learning approach, a matching and non-matching suggestion can be more easily recognized by the machine learning technique in the beginning (e.g., as the pair evaluation model is being trained initially) by taking the highest combined evaluations and the lowest combined evaluations for some field in a record. This is another example of biased sampling, and can increase the likelihood that the records shown to the user are a matching and not matching (e.g., positive or false positives, respectively). In other embodiments, using the biased sampling active learning approach, the machine learning technique may identify indeterminate record pairs, such as a record pair that the pair evaluation model assigns a 50% probability of containing a match. This percentage indicates that the model has little confidence in its assessment as compared to a higher or lower probability. The machine learning technique can thus present indeterminate pairs to the user and adjust the model based on the user's input responses to increase the confidence of the pair evaluation model. In further embodiments, the machine learning technique may identify record pairs where the model has relative confidence in its assessment, and may present these pairs to the user to improve the model. For example, the machine learning technique may identify a record pair that the model assigns a match probability between 70% and 80%, and may present this pair to the user. The machine learning technique can then adjust the model to be more or less confident in its assessment based on the user's input responses. Still further embodiments that utilize other biased sampling strategies to present a number of matching pairs identified by the machine learning technique, receive user input in response, and adjust the pair evaluation model accordingly are understood to be within the scope of the present disclosure.

An unsupervised learning technique allows for no interaction from a user or other information source. Examples of an unsupervised machine learning technique include clustering.

In some embodiments, a trainer/evaluator/validator 550 can take a sample of the pairs from feature evaluator 540. The sample can be chosen by an algorithm (e.g., biased sampling as described above), a user, randomly, or any combination thereof. There is no set size the sample must be. Some samples can be the size of the available memory. Other samples can be set at a specific number, for example 10,000 pairs. Still further, other samples can be set as a number that is determined by a function or process. When using a sample, a machine learning technique or a user (e.g., via a user interface such a user interface 524) can label the pairs in the sample or a portion of the pairs in the sample to create the pair evaluation model.

As described above, active learning techniques may significantly speed up model training (e.g., training pair evaluation models and blocking models) by intelligent biased selection matched records, automatically or manually evaluating those matched records, and training the model with the results. However, biased sampling can result in a biased model if the bias introduced by the sampling is not accounted for in the model training and improvement. Accordingly, in some implementations machine learning technique takes into account the biased probabilities associated with the sampled results when improving/training the models. Specifically, the bias is corrected by taking into account the probability that the false positives and/or false negatives would occur in random sampling without the bias. Bias correction is accomplished by any suitable technique. For example, in training the models, the bias introduced by the active learning sampling may be corrected for by resampling, or by taking mini-batches from the matching results and bias sampling inversely to the probability of the mini-batches being sampled. In the context of model evaluation/validation, the bias introduced by the active learning sampling may be corrected for, for example, by down weighting the objective function for some samples.

The pair evaluation model can output a score that represents the likelihood that the records in each pair are related to a similar entity. The score may be a number between 1 and 0, with 1 representing 100% likelihood that the records in the pair are related to the same entity and 0 representing 0% likelihood that the records in the pair are related to the same entity.

As was previously discussed, record assessor 560 receives the pairs with one or more evaluations from feature evaluator 540 associated with them and the pair evaluation model in order to assess the likelihood that the records in each pair are related to a similar entity. Record assessor 560 applies the pair evaluation model to the one or more evaluations of each pair. Because the sample of pairs has already been trained to the records, the process of scoring new pairs can be accomplished with relative ease using the pair evaluation model.

Because trainer/evaluator/validator 550 can be based on pairs it has already seen, new pairs that are processed in record assessor 560 can update the pair evaluation model to incorporate new records that it sees. Updates to the pair evaluation model allow for increased precision of the system over time.

Figure 6:
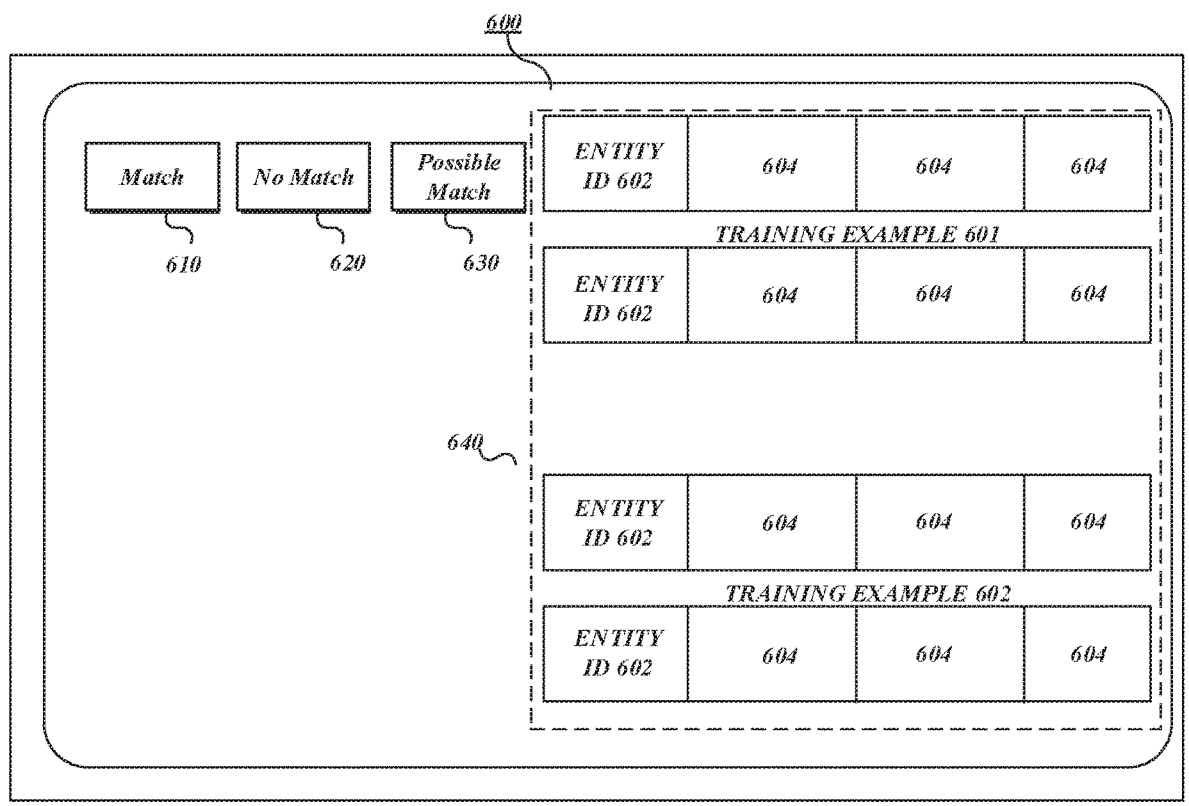
FIG. 6 is an example user interface for user supervision of an active machine learning process.

FIG. 6 depicts an example user interface 600 for user supervision of an active machine learning process. Interface 600 includes a user input section having multiple user input options, including a match button 610, a no match button 620, and a possible match button 630. User interface 600 further includes a machine learning example section 640, configured to display machine learning training examples 601, 602. In the example illustrated in FIG. 6, each training example 601, 602 includes a pair of records, each record including an entity id field 602 and one or more data fields 604. The system may present each record pair to the user and request that the user determine whether the records match, do not match, or that the user is unsure of a match, by using match button 610, no match button 620, and possible match button 630.

In an active learning sequence, a user may be prompted to label training example 601. The user may select the appropriate input (e.g., match button 610, no match button 620, or possible match button 630) from the user input section of interface 600. Training example 602 may be a training example that the user has previously labeled, and the system may alter the visual display of training example 602 to show the user the selection they made. Displaying a previously labeled example may permit the user to confirm their initial selection because, when a user is working quickly through a series of training examples, an inadvertent button press becomes possible. The system may be configured to present the user with a continuous stream of training examples, scrolling in the machine learning example section 640 for any length of time that the user elects to continue labeling training examples. That is, the system may be designed such that machine learning evaluation model updates and training example reevaluation can be performed by the system at a rate that permits the continuous presentation of training examples to the user without requiring a pause for the system to update.

Figure 7:
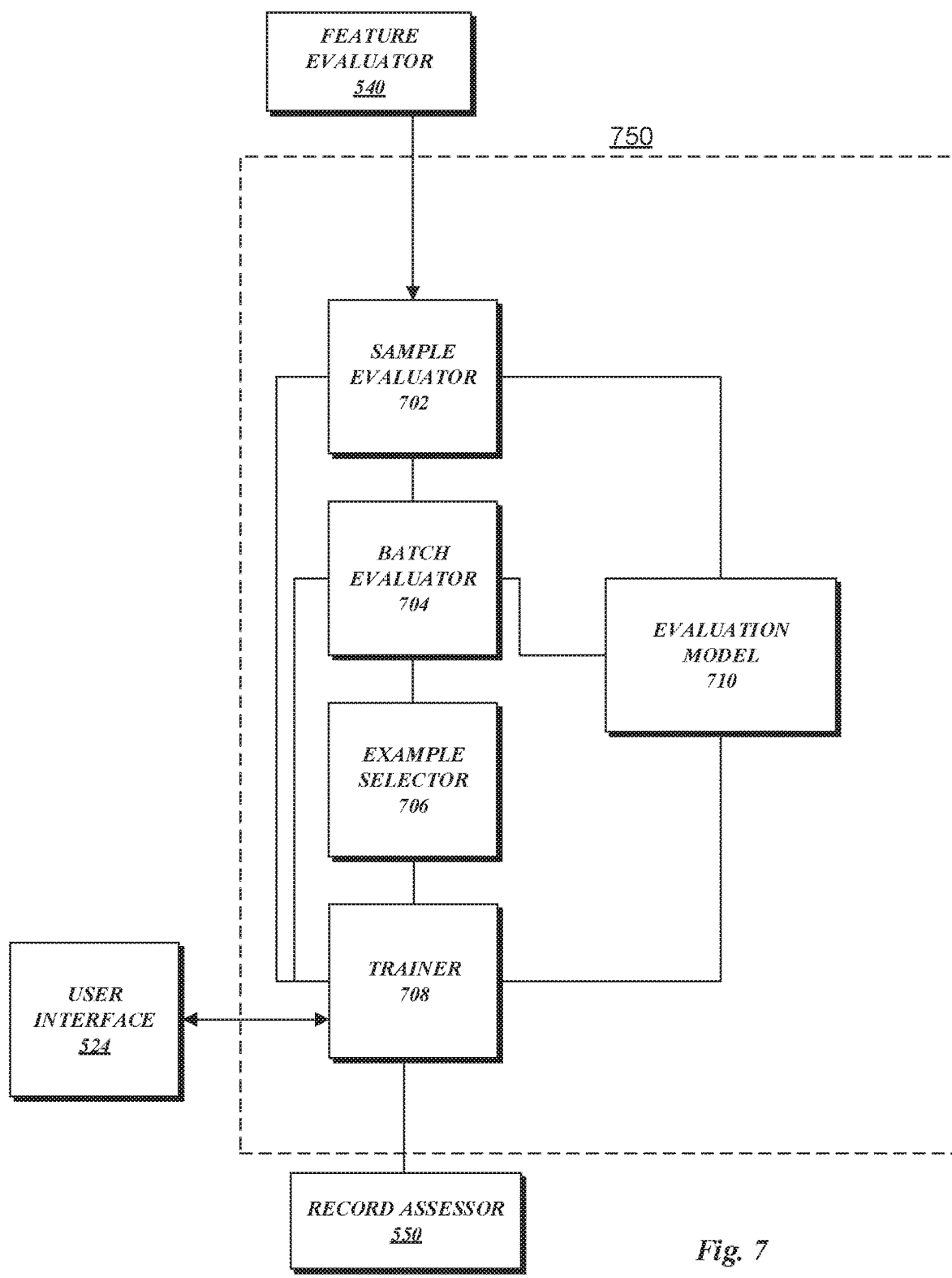
FIG. 7 is a block diagram of an example machine learning system.

FIG. 7 depicts an example of a trainer/evaluator/validator 750 configured to provide efficient model training in an active learning approach biased according to match confidence. Trainer/evaluator/validator 750, as illustrated in FIG. 7, may provide all of the features and aspects discussed herein with respect to trainer/evaluator/validator 550, as well as the additional features and aspects discussed below. Trainer/evaluator/validator 750 may be configured for active learning to train evaluation model 710 in an efficient manner through user interaction via user interface 524.

Trainer/evaluator/validator 750 may be configured to bias the active learning sequence according to uncertainty scores of data examples. In an active learning sequence, a user may be prompted to label a data example. The user may label the example and the results may be used to update a machine learning evaluation model 710 according to the user's labeling. Where evaluation model 710 can accurately label a data example, user labeling that merely confirms the evaluation model 710 results may provide less new information for updating the model than user labeling of a data example about for which the evaluation model 710 cannot produce an accurate label. Accordingly, training the evaluation model 710 according to data examples having high uncertainty scores may accelerate the process of model training.

An uncertainty score of a data example may indicate a level of uncertainty in a model's evaluation of the data example. In some implementations, a data example may receive both a label and an uncertainty score when evaluated by a machine learning model. That is, the label may represent a determination result of the model and the uncertainty score may represent a confidence level in the determination result. In some implementations, the uncertainty score of the data example may be derived directly from the determination result. For example, in the pair matching example discussed herein, a determination result may be a probability, measured from 0 to 100 percent that a record pair (e.g., the data example) includes a match. A 100 percent probability indicates a definite match and a 0 percent probability indicates a definite non-match. A 50 percent probability indicates a record pair about which the model cannot determine whether it is more likely than not to contain a match. Thus, a 50 percent probability of matching as a determination result indicates a maximum uncertainty score. In this example, uncertainty scores may be inversely related to the absolute value of the difference between the 0 to 100 percent determination result and 50 percent. Thus, determination results closer to 50 percent have high uncertainty scores while determination results close to 0 or 100 percent have low uncertainty scores. The inverse relationship between determination results and uncertainty scores may be proportional in nature, and/or may follow other mathematical relationships, e.g., logarithmic, exponential, etc.

As discussed above, trainer/evaluator/validator 750 may receive a sample of data examples from feature evaluator 540. The sample of data examples may serve as a training dataset for trainer/evaluator/validator 750 and may represent a portion of or an entirety of all records to be evaluated. Sample evaluator 702 may apply the evaluation model 710 to all data examples of the training dataset to generate determination results and uncertainty scores for all or some of the data examples. In some implementations, all of the data examples of training data set may be evaluated for determination of a corresponding uncertainty score.

Batch evaluator 704 may receive a batch of data examples from sample evaluator 702. The batch of data examples may be a subset of the training dataset of data examples evaluated by sample evaluator 702, and may be selected by sample evaluator 702 and/or by batch evaluator 704. The batch of data examples may be selected according to their uncertainty scores. The selected batch of data examples may be those having the highest uncertainty scores from the training dataset. For example, the batch of data examples may include the most uncertain 10 percent of data examples from the training data set. The size of the batch of data examples may be predetermined as an absolute number (e.g., 1000 examples) and/or may be predetermined as a percentage of the training dataset. In some implementations, the size of the batch of data examples may be predetermined according to system characteristics and/or may be dynamically determined during system processing. Batch size considerations are discussed in greater detail below.

In some implementations, the batch of data examples may further be determined according to a diversity measurement between data examples of the batch. If a batch of data examples is selected purely according to uncertainty scores, some examples of the batch of data examples may be very similar in one or more aspects. For example, a series of duplicate records in a database could lead to a series of identical data examples. Identical data examples would, of course, have an identical uncertainty score. Requiring a user to label more than one of a series of identical data examples would be a waste of time and resources. Two similar, but not identical data examples, may introduce the same difficulty. In some embodiments, once the first of the data examples is labeled, the resultant model updates may be sufficient to significantly reduce the uncertainty score of the second example, rendering it inefficient as a labeling example for the user. In some embodiments, rather than updating the results shown while a user is observing results, results can be optimized for diversity and presented to the user up-front. Accordingly, the system may be configured to determine the data examples of the batch according not just to the uncertainty scores, but also to a diversity score of each data example as compared to the other data examples of the batch. A diversity score of a data examples may be a measurement of the how different each data example of the batch is from each other data example of batch. In selecting the batch of data examples, the system may apply a weight to the uncertainty scores and to the diversity scores of the batch of data examples.

Batch evaluator 704 may obtain determination results and uncertainty scores for all or some of the batch of data examples. In some implementations, batch evaluator 704 may apply the evaluation model 710 to all data examples of the batch of data examples to obtain the determination results and uncertainty scores. In some implementations, where evaluation model 710 has not been updated after determination results and uncertainty scores were determined by sample evaluator 702, batch evaluator 704 may obtain the previously generated results and uncertainty scores.

Example selector 706 may select one or more specific data examples of the batch of data examples. The one or more specific data examples may be selected for an active supervised machine learning task. The one or more specific data examples may be selected by example selector 706 according to an uncertainty score. The one or more specific data examples may be selected by example selector 706 according to a comparison between an uncertainty score of the data example and the uncertainty scores of the remaining data examples in the batch. For example, data examples having the greatest uncertainty score may be selected from the batch as one or more specific data examples.

Trainer 708 may obtain a user-labeling of the specific data examples and cause an update of evaluation model 710. Trainer 708 may communicate with user interface 524 to request that the user label the specific data example. Trainer 708 may receive, from the user interface, a user's labeling of the specific data examples. Trainer 708 may use the labeled specific data examples to perform an update of evaluation model 710. The newly labeled specific data examples may be used by trainer 708 to provide information required to generate an updated evaluation model 710 via machine learning techniques.

After evaluation model 710 updating, batch evaluator 704 may obtain updated determination results and updated uncertainty scores of the remaining data examples of the batch of data examples. Batch evaluator 704 may apply updated evaluation model 710 to the remaining data examples to obtain the updated determination results and updated uncertainty scores. Example selector 706 may select a second set of one or more specific data examples from the remaining data examples of the batch of data examples for user labeling by trainer 708. Trainer 708 may communicate with user interface 524 to obtain user labels of the second set of specific data examples and user these results to again update the evaluation model. This loop may continue until a batch loop end point is reached.

When the batch loop end point has been reached, process flow may return to sample evaluator 702. Sample evaluator 702 may apply the most current updated evaluation model 710 to the all or some of the data examples of the training dataset to generate new determination results and uncertainty for the training dataset. A new batch of data examples may be selected from the training dataset according to the new uncertainty scores, and batch evaluator 704 may then begin a new batch loop, which may run until the batch loop end point is reached again. In some implementations, sample evaluator 702 may apply a most current updated evaluation model 710 to the training dataset prior to completion of the batch loop, after a threshold number of batch data examples have been user labeled.

The sample loop may be repeated until a sample loop end point is reached. In some implementations, the sample loop end point may be selected according to a requirement to user label a specified percentage of data examples within the training data set. In some implementations, the sample loop end point may be selected according to a certainty level of the model, e.g., a factor based on the uncertainty scores of the data examples in the training data set. The factor may be an average uncertainty score, a maximum uncertainty score, and/or any other factor based on the uncertainty scores of the training set data examples that may be representative of the evaluation model 710 uncertainty with respect to the entire training data set.

In some implementations, batch sizes, batch loop end points, and the threshold number of user labeled data examples before updating training dataset evaluations may be selected to optimize work flow efficiency. In a non-optimized model, a user may label a batch of training examples and each labeling may cause an evaluation model update. After the batch of data examples is fully labeled, the updated model may be applied to the remainder of the training data set to determine new results and uncertainty scores and select a new batch of data examples. Applying the model to the remainder of the training data set may be time consuming, as the system processes thousands or millions of data examples. During the processing time of the system, the user may have to wait until they can resume a labeling task.

To address this, the system may be optimized such that, after a user completes labeling of a batch of data examples, the determination results and uncertainty scores of the training dataset have already been updated and a new batch of data examples may be selected immediately. Accordingly, the threshold number of labeled batch data examples required to be reached before an update is performed on the training dataset uncertainty scores may be determined according to one or more of the number of examples in the batch, a batch loop end point, the average or estimated time for a user to label an example, a system processing speed, model complexity, and/or a number of examples in the training data set. The system may dynamically estimate a training dataset update time required to update the uncertainty scores of the examples in the training data set according to system processing speed, model complexity, and/or the number of examples in the training dataset. The system may dynamically estimate a batch label remaining time, according to an estimate of a user's time to label a data example and/or a number of data examples remaining before the batch loop end point. The batch loop end point may be selected as a percentage of the total number of examples in the batch, e.g., 50 to 100 percent. The estimate of the user's time may be made according to a measurement of the user's labeling time on previous examples and/or based on an estimate of previous users' labeling times. When a batch label remaining time is within a specified range (e.g., 1 to 10 percent) of a training dataset update time, the system may begin the determination result and uncertainty score update of the training dataset. Accordingly, the training dataset update may finish at approximately the same time as the user labeling of the batch, permitting a new batch to be selected and provided to the user efficiently, without requiring the user to wait. In some implementations, completion of the training dataset update may trigger the end of the batch loop, regardless of whether all examples in the batch have been labeled.

In some implementations, the batch size may be predetermined, e.g., to consist of a certain total number of examples or a certain percentage of the training data set. Batch size may also be dynamically determined. For example, batch size may be dynamically determined according to a certainty level of the evaluation model. An untrained model may have a low certainty level. In such a model, each newly labeled example used to update the model may have a more significant effect on the model results. That is, an untrained model may improve faster than a model that is already performing well. Accordingly, in some implementations, batch sizes for a model having a low certainty level may be smaller than batch sizes for a model having a high certainty level. That is, because the model's performance improves more rapidly, it may be beneficial to update the training data set uncertainty scores and select a new batch of training examples more frequently.

In some implementations, batch size may be determined according to a user labeling time and an estimated system processing speed. The batch size may be selected such that the entirety of the batch of data examples can be reevaluated by application of an updated model while the user is labeling a data example. Thus, the user may be provided with the most uncertain example for labeling. The user may label the example, causing the model to update. While the user is labeling the next most uncertain example, the updated model may be applied to the remainder of the batch to update the uncertainty scores. When the user finishes the labeling task, the system may have finished the updating task, and a new example may be selected from the batch based on the updated batch uncertainty scores.

The description of the machine learning training example selection methods and systems used by trainer/evaluator/validator 750 use an entity resolution system for illustrative purposes only. Although the system is described with respect to an entity resolution example, it is not limited to such a system. The machine learning training example selection techniques may be used to train any type of machine learning model for use with any type of dataset.

Figure 8:
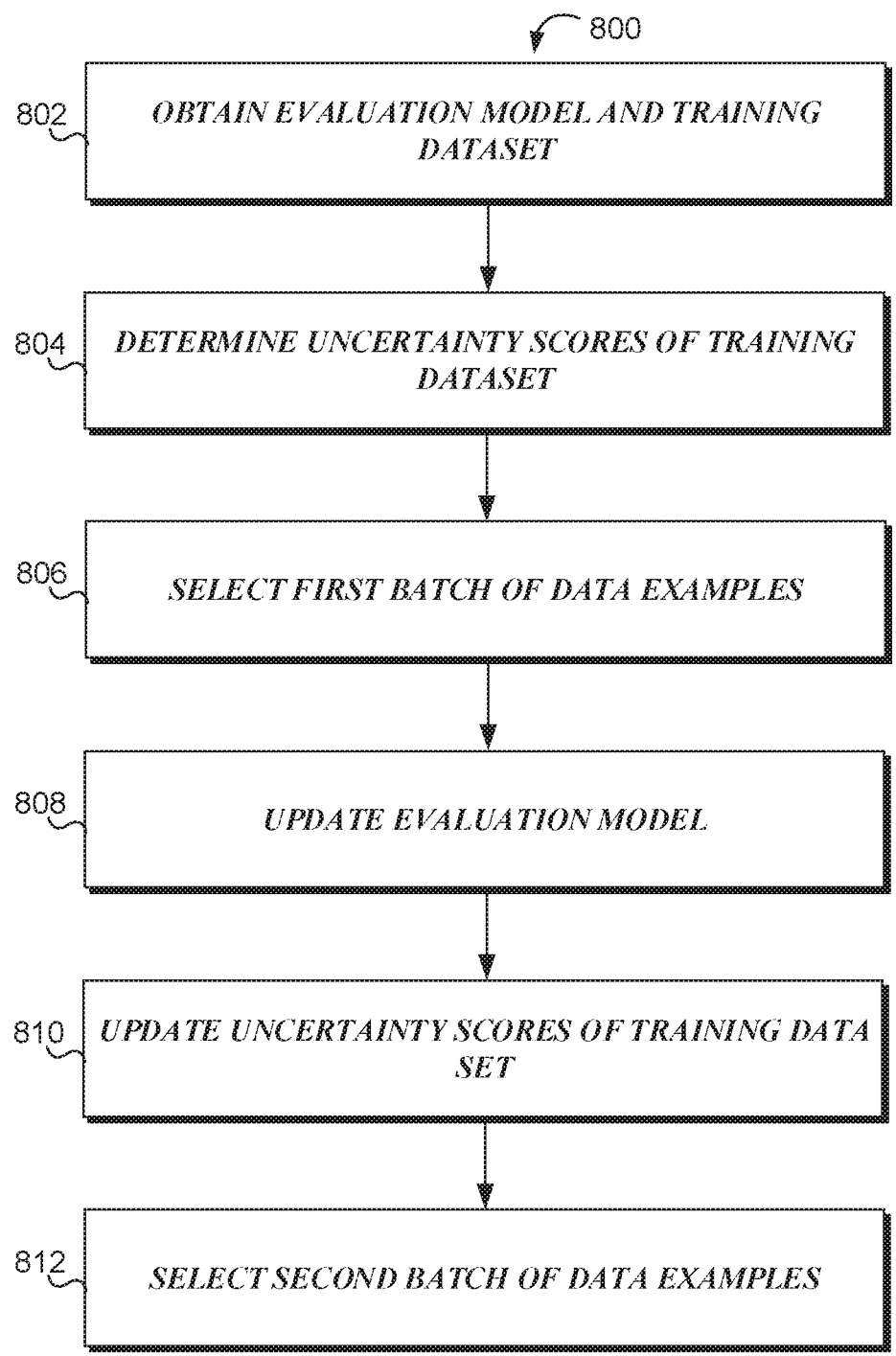
FIG. 8 is a flowchart representing an example method for selecting training examples for active machine learning.

FIG. 8 depicts a flowchart of a training example selection process 800. The various processing operations and/or data flows depicted in FIG. 8 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 802, process 800 may include obtaining an evaluation model and a training dataset. The system may obtain a training dataset and an evaluation model with which to evaluate the examples of the training dataset. The evaluation model may be a machine learning model utilizing any machine learning techniques or algorithms. The training dataset may include a dataset of data examples or training examples requiring labeling or other type of classification or processing. The training dataset may be a portion of a larger dataset and/or may be a complete dataset.

In an operation 804, process 800 may include determining uncertainty scores of the training dataset. The system may apply the evaluation model to the data examples of the training dataset to generate determination results and uncertainty scores. As discussed above, uncertainty scores may be derived directly from determination results and/or may be determined separately.

In an operation 806, process 800 may include selecting a first batch of data examples from the training dataset. The first batch of data examples may be selected according to uncertainty scores. In some implementations, the first batch of data examples may be selected as the data examples having the highest uncertainty scores in the training dataset.

In an operation 808, process 800 may include updating the evaluation model. Updating the evaluation model may include labeling one or more of the data examples of the batch according to user input received via a user interface. The system may output to the user a data example and receive, in response, a label for the data example. The labeled data example may then be used by the system to update the evaluation model. The evaluation model may be updated after each data example is labeled by a user, and/or may be updated according to several labeled data examples.

In some implementations, uncertainty scores of the batch of data examples may be updated after each model update. The updated uncertainty scores may be used in selecting data examples from the batch to output to the user for labeling.

In an operation 810, process 800 may include updating uncertainty scores of the training dataset. Uncertainty scores and determination results of the training dataset may be updated according to the updated evaluation model. In some implementations, the training dataset update may occur after all examples of the batch have been processed. In some implementations, the training dataset update may occur after a threshold number of training examples of the first batch is labeled. The threshold number may be determined according to at least one of batch size, estimated time for a user to label an example, system processing speed, training dataset size, and other factors.

In an operation 812, process 800 may include selecting a second batch of data examples from the training dataset. The second batch of data examples may be selected according to the updated uncertainty scores of the training dataset. The second batch of data examples may be used by the system to provide additional data examples to a user for labeling. In turn, the evaluation model may be updated according to the labeling performed on the second batch of data examples.

Process 800 may provide an efficient and streamlined method of selecting training examples for labeling in a supervised active machine learning training process. The process 800 may be used to select training examples to accelerate the machine learning process by selecting examples for which the model is least certain. The process 800 may further be used to select optimal sizes of training example batches so as to avoid user downtime.

Returning now to FIG. 5, after the assessment in record assessor 560, the pairs with the scores can be filtered in a filter 570. Filtering can distinguish pairs that have a match probability above a certain threshold. Distinguishing the pairs can include indicating in the records that they are associated with other records. Distinguishing can also include gathering the pairs that have a match probability above a certain threshold in a data structure. The threshold can be user specified or automatically generated based on the output of record assessor 560.

After the pairs are distinguished in filter 570, filter 570 can provide a result based on the filtering. The result can be provided in a number of ways, for example, such as showing one or more matching records, a probability that the pair is associated with the same entity, or any combination thereof.

The result of filter 570 can also be used to resolve matching entities. Resolving matching entities may comprise combining records that are associated with the same records. Resolving matching entities can also comprise grouping matching records into clusters by passing the results of filter 570 to a cluster generator. In various implementations, the system may include one or more cluster generators that may be executed in parallel or serially, in any combination. FIG. 5 includes two illustrative examples of cluster generators: entity cluster generator 580 and location cluster generator 585. In general, entity cluster generator 580 and location cluster generator 585 each generate clusters of records (or clusters of groups of records, as produced by a blocker, for example), where each cluster includes records that have some relationship with one another. In various other embodiments, clusters may be identified/generated by the cluster generators using any general clustering algorithm, including but not limited to connected components, spectral clustering, maximum likelihood clique detection, modularity, and other algorithms known to those skilled in the art. Specific examples of cluster generators (entity cluster generator 580 and location cluster generator 585) are described below in detail. For example, in some embodiments, entity cluster generator 580 may use filtered pairs (or, in some embodiments, unfiltered pairs) to identify clusters of pairs that have a match probability above a certain threshold and that include pair members in common.

Illustratively, entity cluster generator 580 and location cluster generator 585 may generate different clusters when applied to the same list or lists. In some embodiments, entity cluster generator 580 may process clusters of pairs generated from a single list, as described below, to identify clusters of records within the list that reference a common entity. Further, location cluster generator 585 may process pairs that include one record from a list of transactions and one record from a list of locations. One skilled in the art will appreciate that the process depicted in FIG. 5 may be performed with a first list 140 alone to determine entity names in a list of transaction records, and then performed with the first list 140 and a second list 150 of canonical locations to determine locations for each record. Alternatively, in some embodiments, the entity cluster generator 580 and location cluster generator 585 may generate clusters based on common output from the pair generator 530, with the location cluster generator 585 discarding pairs that do not include exactly one record from a list of locations. One skilled in the art will thus appreciate that the illustrative process depicted in FIG. 5 may be performed iteratively or in parallel as needed, on one or more lists of records, to associate a canonical entity name and location with each record of a set of records.

Clusters of record pairs may also be passed to a location determiner 595, which may determine a canonical location for each transaction. Illustratively, the first list 140 may be a list of transactions, with each transaction containing some indication of location that may not be consistent with other transactions in the list. For example, the first list 140 may include transactions with location indications such as "NYC," "NY City," "New York City," and so forth. The second list 150 may be a list of locations. Illustratively, the second list may be a canonical list of location names associated with the transactions in the first list 140.

Each record pair may include one record from each list, and the clusters may each include a particular record from one list. Clusters of pairs may thus illustratively be organized as a graph, which the location determiner 595 may then prune to produce a bipartite graph. Each record of the first list 140 may be paired to one or more records of the second list 150, and each pairing may be assigned a match probability as described above. The location determiner 595 may thus determine a canonical location for each transaction record by pruning the edges of the graph to include only one pairing for each transaction record. For example, the location determiner 595 may receive a cluster of pairs including {transaction #1, San Francisco}, {transaction #1, San Diego}, and {transaction #1, San Antonio}, having match probabilities of 0.7, 0.6, and 0.3 respectively. The location determiner 595 may thus determine San Francisco as a canonical location to associate with transaction #1, and may discard the other two pairings.

In some embodiments, the second list 150 may be generated by comparing location indications in the first list 140 to a canonical list of locations. Illustratively, each location indication in the first list may be paired with one or more locations from the canonical list, and each pairing may be assigned a match probability, as described above. The location determiner 595 may then organize and prune the edges of the resulting graph to determine a subset of locations from the canonical list. The subset of locations may then be paired with transactions from the first list 140 as described above, and provided to the location determiner 595 as the second list 150.

In some embodiments, the cluster generators may be trained, evaluated, validated, and improved via any of the methods described above in reference to the blocking models and pair evaluation models. For example, machine learning (including active learning/biased sampling) techniques may be used to improve the cluster generators. Similarly, as described above in reference to the blocking models, weightings may be applied when combinations of criteria are used in clustering records. The weightings may be optimized/trained to improve the accuracy of the clusters of records.

In some embodiments, the system may enable determining differences (e.g., a "diff") between two sets of clusters. Thus, for example, if a user or the system changes any of the strategies described herein (e.g., blocking, pair generation, filtering, etc.) such that the clusters that are generated is changes, the system may enable a user to identify (e.g., via a user interface) the differences between the sets of clusters. Identification of such differences may be useful, for example, for debugging or improving the cluster generation or other aspects of the system as described herein.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.
Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

What is claimed is:

1. A system utilizing active learning for training a machine learning model of an entity resolution system, the system comprising:
  one or more processors and a memory storing instructions that, when executed by the one or more processors, cause the system to:
   obtain a machine learning model and a training dataset, the training dataset including a plurality of training examples, each training example of at least a portion of the training examples including one or more records;

determine uncertainty scores for the plurality of training examples according to the machine learning model;
determine a first machine learning model certainty level according to the uncertainty scores of the plurality of training examples of the training dataset;
select a first example batch from the plurality of training examples according to the first machine learning model certainty level;
perform a first update to the machine learning model according to at least one labeled training example of the first example batch;
select a second example batch from the plurality of training examples according to a diversity score indicative of:
  a first degree of difference between the second example batch and the first example batch; and
  a second degree of difference between the second example batch and one or more remaining training examples, besides the first example batch, of the plurality of training examples;
perform a second update to the machine learning model according to a labeled second training example from the second example batch; and
resolve, based at least in part on the second updated machine learning model, matching entities associated with one or more sets of sets of records.

2. The system of claim 1, wherein the number of training examples in the first example batch is based on the first machine learning model certainty level.

3. The system of claim 1, wherein the system is further caused to:
determine updated uncertainty scores for the plurality of training examples in response to the first update of the machine learning model;
determine a second machine learning model certainty level according to the updated uncertainty scores of the plurality of training examples of the training dataset; and
select the second example batch from the plurality of training examples further according to the second machine learning model certainty level, wherein at least one labeled training example of the second example batch is capable of being used in the second update.

4. The system of claim 3, wherein to determine updated uncertainty scores for the plurality of training examples the system is further caused to determine updated uncertainty scores for the plurality of training examples according to the first update of the machine learning model after a threshold number of training examples of the first example batch are labeled by a user.

5. The system of claim 4, wherein the threshold number is determined according to any of a number of training examples in the first example batch, an estimated time for a user to label a training example in the first example batch, a system processing speed, and a number of training examples in the first example batch of the training dataset.

6. The system of claim 5, wherein the threshold number is determined such that a time to completion of labeling the threshold number of training examples of the first batch and a time to completion of determining updated uncertainty scores of the plurality of training examples of the training dataset are within a predetermined range of each other.

7. The system of claim 1, wherein to perform the first update to the machine learning model the system is further caused to:
obtain a first label of a first training example of the first example batch from a user, wherein the first training example is selected according to the uncertainty scores of the first example batch;
perform the first update according to the first label;
determine updated uncertainty scores of the first example batch;
obtain a second label of a second training example of the first example batch from the user, wherein the second training example is selected according to the updated uncertainty scores of the first example batch; and
perform the first update according to the second label.

8. The system of claim 1, wherein each record of the one or more records includes an entity identification field and an entity location field, and the one or more sets of records include at least a portion of the training dataset.

9. The system of claim 1, wherein the selecting of the first example batch comprises determining a batch size based on the first machine learning model certainty level, a time consumed in labelling the first example batch, and an estimated processing or evaluation speed.

10. The system of claim 9, wherein the batch size is inversely correlated to a frequency of selecting new batches of training examples.

11. A method for entity resolution utilizing active learning for training a machine learning model, the method being performed on a computer system having one or more physical processors programmed with computer program instructions that, when executed by the one or more physical processors, cause the computer system to perform the method, the method comprising:
obtaining a machine learning model and a training dataset, the training dataset including a plurality of training examples, each training example of at least a portion of the training examples including one or more records;
determining uncertainty scores for the plurality of training examples according to the machine learning model;
determining a first machine learning model certainty level according to the uncertainty scores of the plurality of training examples of the training dataset;
selecting a first example batch from the plurality of training examples according to the first machine learning model certainty level;
performing a first update to the machine learning model according to at least one labeled training example of the first example batch;
selecting a second example batch from the plurality of training examples according to a diversity score indicative of:
  a first degree of difference between the second example batch and the first example batch; and
  a second degree of difference between the second example batch and one or more remaining training examples, besides the first example batch, of the plurality of training examples;
performing a second update to the machine learning model according to a labeled second training example from the second example batch; and
resolving, based at least in part on the second updated machine learning model, matching entities associated with one or more sets of sets of records.

12. The method of claim 11, wherein the number of training examples in the first example batch is based on the first machine learning model certainty level.

13. The method of claim 11, wherein the method further comprises:
    determining updated uncertainty scores for the plurality of training examples in response to the first update of the machine learning model;
    determining a second machine learning model certainty level according to the updated uncertainty scores of the plurality of training examples of the training dataset; and
    selecting the second example batch from the plurality of training examples further according to the second machine learning model certainty level, wherein at least one labeled training example of the second example batch is capable of being used in the second update.

14. The method of claim 13, wherein to determine updated uncertainty scores for the plurality of training examples the system is further caused to determine updated uncertainty scores for the plurality of training examples according to the first update of the machine learning model after a threshold number of training examples of the first example batch are labeled by a user.

15. The method of claim 14, wherein the threshold number is determined according to any of a number of training examples in the first example batch, an estimated time for a user to label a training example in the first example batch, a system processing speed, and a number of training examples in the first example batch of the training dataset.

16. The method of claim 15, wherein the threshold number is determined such that a time to completion of labeling the threshold number of training examples of the first batch and a time to completion of determining updated uncertainty scores of the plurality of training examples of the training dataset are within a predetermined range of each other.

17. The method of claim 11, further comprising:
    obtaining a first label of a first training example of the first example batch from a user, wherein the first training example is selected according to the uncertainty scores of the first example batch;
    performing the first update to the machine learning model according to the first label;
    determining updated uncertainty scores of the first example batch;
    obtaining a second label of a second training example of the first example batch from the user, wherein the second training example is selected according to the updated uncertainty scores of the first example batch; and
    performing the first update to the machine learning model according to the second label.

18. The method of claim 11, wherein each record of the one or more records includes an entity identification field and an entity location field, and the one or more sets of records include at least a portion of the training dataset.

19. A non-transitory computer readable medium comprising instructions that, when executed, cause one or more processors to perform:
    obtaining a machine learning model and a training dataset, the training dataset including a plurality of training examples, each training example of at least a portion of the training examples including one or more records;
    determining uncertainty scores for the plurality of training examples according to the machine learning model;
    determining a first machine learning model certainty level according to the uncertainty scores of the plurality of training examples of the training dataset;
    selecting a first example batch from the plurality of training examples according to the first machine learning model certainty level;
    performing a first update to the machine learning model according to at least one labeled training example of the first example batch;
    selecting a second example batch from the plurality of training examples according to a diversity score indicative of:
        a first degree of difference between the second example batch and the first example batch; and
        a second degree of difference between the second example batch and one or more remaining training examples, besides the first example batch, of the plurality of training examples;
    performing a second update to the machine learning model according to a labeled second training example from the second example batch; and
    resolving, based at least in part on the second updated machine learning model, matching entities associated with one or more sets of sets of records.

20. The non-transitory computer readable medium of claim 19, wherein the instructions further cause the one or more processors to perform:
    determining updated uncertainty scores for the plurality of training examples according to the updated machine learning model;
    determining a second machine learning model certainty level according to the updated uncertainty scores of the plurality of training examples of the training dataset; and
    selecting a second example batch from the plurality of training examples according to the second machine learning model certainty level, at least one labeled training example of the second example batch capable of being used in an update of the updated machine learning model.

* * * * *